US007599836B2

(12) United States Patent
Ichikawa et al.

(10) Patent No.: US 7,599,836 B2
(45) Date of Patent: Oct. 6, 2009

(54) VOICE RECORDING SYSTEM, RECORDING DEVICE, VOICE ANALYSIS DEVICE, VOICE RECORDING METHOD AND PROGRAM

(75) Inventors: Osamu Ichikawa, Ebina (JP); Masafumi Nishimura, Yokohama (JP); Tetsuya Takiguchi, Yokohama (JP)

(73) Assignee: Nuance Communications, Inc., Burlington, MA (US)

( * ) Notice: Subject to any disclaimer, the term of this patent is extended or adjusted under 35 U.S.C. 154(b) by 912 days.

(21) Appl. No.: 11/136,831

(22) Filed: May 25, 2005

(65) Prior Publication Data

US 2005/0267762 A1 Dec. 1, 2005

(30) Foreign Application Priority Data

May 26, 2004 (JP) ............................. 2004-156571

(51) Int. Cl.
*G10L 17/00* (2006.01)

(52) U.S. Cl. ........................ 704/249; 704/200; 704/227

(58) Field of Classification Search ................. 704/200, 704/211, 227, 219, 249, 270, 270.1, 275; 709/204

See application file for complete search history.

(56) References Cited

U.S. PATENT DOCUMENTS 6,457,043 B1 * 9/2002 Kwak et al. ................. 709/204
7,054,820 B2 * 5/2006 Potekhin et al. ............. 704/275

FOREIGN PATENT DOCUMENTS

JP 02257472 10/1990
JP 10-215331 8/1998
JP 2003060792 2/2003
JP 2003-114699 4/2003

* cited by examiner

*Primary Examiner*—Huyen X. Vo
(74) *Attorney, Agent, or Firm*—Wolf, Greenfield & Sacks, P.C.

(57) ABSTRACT

To provide a method of specifying each of speakers of individual voices, based on recorded voices made by a plurality of speakers, with a simple system configuration, and to provide a system using the method. The system includes: microphones individually provided for each of the speakers; a voice processing unit which gives a unique characteristic to each pair of two-channel voice signals recorded with each of the microphones 10, by executing different kinds of voice processing on the respective pairs of voice signals, and which mixes the voice signals for each channel; and an analysis unit which performs an analysis according to the unique characteristics, given to the voice signals concerning the respective microphones through the processing by the voice processing unit, and which specifies the speaker for each speech segment of the voice signals.

2 Claims, 7 Drawing Sheets

VOICE RECORDING SYSTEM, RECORDING DEVICE, VOICE ANALYSIS DEVICE, VOICE RECORDING METHOD AND PROGRAM

BACKGROUND OF THE INVENTION

The present invention relates to a method of and a system for recording voices made by a plurality of speakers and specifying each of the speakers based on the recorded voices.

Along with advancement and accuracy improvement of voice recognition technologies, application fields thereof have been increasingly widespread. The voice recognition technology has started to be used for creation of business documents by dictation, medical observations, creation of legal documents, creation of closed captions for television broadcasting, and the like. Moreover, in trials, meetings, or the like, there has been considered introduction of a technology of conversion into text by using voice recognition, in order to create records and minutes by recording processes and writing the processes in texts.

In a situation where such a voice recognition technology is used, it may be required not only to simply recognize recorded voices but also to specify each of speakers of individual voices from voices made by a plurality of speakers. As a method for specifying speakers, there have been heretofore proposed various methods such as a technology of specifying speakers based on a direction in which voices arrive by use of directional characteristics obtained by a microphone array or the like (for example, see Patent Document 1) and a technology of adding identification information for specifying speakers by converting voices individually recorded for each of the speakers into data (for example, see Patent Document 2).

[Patent Document 1] Japanese Patent Laid-Open Publication No. 2003-114699

[Patent Document 2] Japanese Patent Laid-Open Publication No. Hei 10 (1998)-215331

As described above, in the voice recognition technology, it may be required to specify each of the speakers of the individual voices from the recorded voices of the plurality of speakers. There have been heretofore proposed various methods. However, by use of a method of specifying each of the speakers by use of directional microphones such as the microphone array, it was impossible to achieve sufficient accuracy depending on voice recording environments and other conditions, such as the case where the plurality of speakers exist in similar directions from the microphones.

Moreover, a method of individually recording voices for each of speakers requires recorders prepared for the respective speakers. Accordingly, since a system scale is increased, costs and efforts in system introduction and system maintenance are increased.

Incidentally, speeches in trials or meetings have the following characteristics.

- Questions and answers make up a large part of dialogues, and the questioner hardly questions a plurality of respondents at the same time.
- Except unexpected remarks such as jeers, only one person makes a speech at one time, and voices rarely overlap.

In such a special recording environment, in order to specify each of the speakers of the individual voices from the voices made by the plurality of speakers, it is considered to utilize the characteristics of the recording environment as described above.

SUMMARY OF THE INVENTION

It is an object of the present invention to provide a method of specifying each of speakers of individual voices from recorded voices of a plurality of speakers, with a simple system configuration, and to provide a system using the method.

Moreover, particularly, it is the object of the present invention to provide a method of specifying each of speakers of individual voices recorded in a special situation such as a trial or a meeting by use of characteristics of the recording environment, and to provide a system using the method.

In order to achieve the foregoing object, the present invention is realized as a voice recording system constituted as below. Specifically, this system includes: microphones individually provided for each of speakers; a voice processing unit which gives a unique characteristic to each of two-channel voice signals recorded with the respective microphones, by executing different kinds of voice processing on the respective voice signals, and which mixes the voice signals for each channel; and an analysis unit which performs an analysis according to the unique characteristics, given to the voice signals concerning the respective microphones through the processing by the voice processing unit, and which specifies the speaker for each speech segment of the voice signals.

To be more specific, the voice processing unit described above inverts a polarity of a voice waveform in the voice signal of one of the channels among the recorded two-channel voice signals, or increases or decreases signal powers of the recorded two-channel voice signals, respectively, by different values, or delays the voice signal of one of the channels among the recorded two-channel voice signals.

Moreover, the analysis unit specifies speakers of the voice signals by working out a sum of or a difference between the two-channel voice signals which are respectively mixed, or by working out a sum of or a difference between the voice signals, after correcting a difference due to a delay of the two-channel voice signals which are respectively mixed.

In addition, the system described above can adopt a configuration further including a recording unit which records on a predetermined recording medium the voice signals subjected to the voice processing by the voice processing unit. In this case, the analysis unit reproduces voices recorded by the recording unit, analyzes the voices as described above, and specifies the speaker.

Moreover, another aspect of the present invention to achieve the foregoing object is also realized as the following voice recording system. Specifically, this system includes: microphones provided to deal with respective four speakers; a voice processing unit which performs the following processing on four pairs of two-channel voice signals recorded with the respective microphones: as for one pair of the voice signals, no processing; as for another pair, inversion of the voice signal in one of two channels; as for still another pair, elimination of the voice signal in one of the two channels; and as for yet another pair, elimination of the voice signal in the other of the two channels, and which mixes these voice signals for each of the channels; and a recording unit which records the two-channel voice signals processed by the voice processing unit.

Additionally, the system described above can also adopt a configuration including an analysis unit which reproduces voices recorded by the recording unit and executes the following analyses (1) to (4) on the reproduced two-channel voice signals.

(1) A voice signal obtained by adding up the two-channel voice signals is set to a speech of a first speaker.

(2) A voice signal obtained by subtracting one of the two-channel voice signals from the other is set to a speech of a second speaker.

(3) A voice signal obtained only from one of the two-channel voice signals is set to a speech of a third speaker.

(4) A voice signal obtained only from the other of the two-channel voice signals is set to a speech of a fourth speaker.

Moreover, the present invention is also realized as the following recording device. Specifically, this device includes: microphones individually provided for each of the speakers; a voice processing unit which executes different kinds of voice processing on two-channel voice signals recorded with the respective microphones; and a recording unit which records on a predetermined recording medium the voice signals subjected to the voice processing by the voice processing unit.

Furthermore, the present invention is also realized as the following voice analysis device. Specifically, this device includes: voice reproduction means for reproducing a voice recorded in two channels on a predetermined medium; and analysis means for specifying a speaker of two-channel voice signals by working out a sum of or a difference between the two-channel voice signals reproduced by the voice reproduction means.

Moreover, still another aspect of the present invention to achieve the foregoing object is also realized as the following voice recording method. Specifically, this method includes: a first step of inputting voices with microphones individually provided for each of the speakers; a second step of giving a unique characteristic to each of voice signals recorded with the respective microphones, by executing different kinds of voice processing on the respective voice signals; and a third step of performing an analysis according to the unique characteristics, given through the voice processing to the voice signals concerning the respective microphones, and specifying the speaker for each speech segment of the voice signals.

Additionally, the present invention is also realized as a program for controlling a computer to implement each function of the above-described system, recording device and voice analysis device, or as a program for causing the computer to execute processing corresponding to the respective steps of the foregoing voice recording method. This program is provided by being distributed while being stored in a magnetic disk, an optical disk, a semiconductor memory or other storage media, or by being delivered through a network.

According to the present invention constituted as described above, different kinds of voice processing are respectively executed on recorded voice signals, whereby a unique characteristic is given to each of the voice signals. When reproduced, the voice signals are subjected to an analysis according to the executed voice processing, whereby a speaker of each voice can be certainly identified upon reproduction of the voices. In addition, since the voice signals can be recorded with general recording equipment capable of two-channel (stereo) recording, the present invention can be implemented with a relatively simple system configuration.

Moreover, in a special recording environment where the number of speakers is limited, and in principle, a plurality of the speakers do not make speeches at the same time, the system can be implemented with a more simple configuration depending on the number of speakers.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENT

With reference to the accompanying drawings, the best mode for implementing the present invention (hereinafter referred to as an embodiment) will be described in detail below.

In this embodiment, two-channel voices are recorded with microphones allocated to each of a plurality of speakers by the speakers, and in recording, different kinds of voice processing are executed for each of the microphones (in other words, each of the speakers). Thereafter, the recorded voices are analyzed according to the processing executed in recording, whereby the speaker of each voice is specified.

Figure 1:
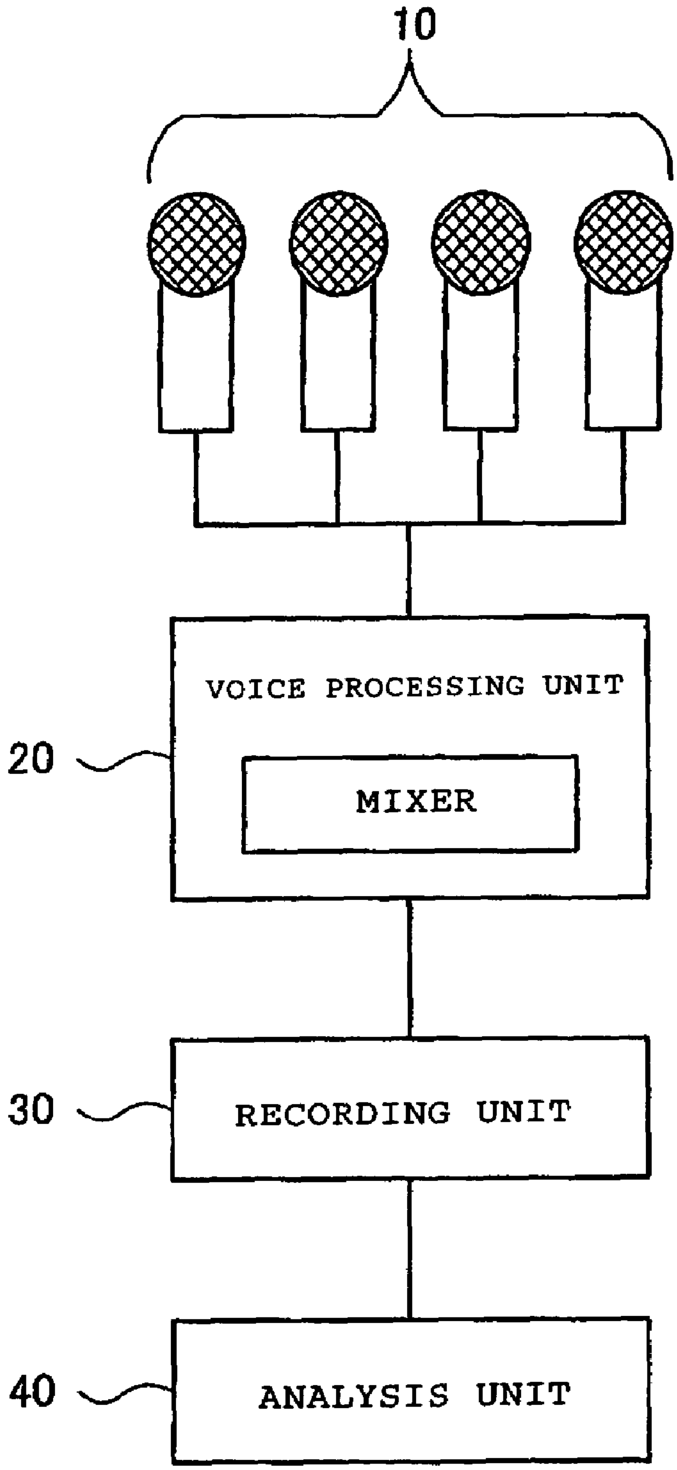
FIG. 1 is a view showing an entire configuration of a voice recording system according to this embodiment.

FIG. 1 is a view showing an entire configuration of a voice recording system according to this embodiment.

As shown in FIG. 1, the system of this embodiment includes: microphones 10 which input voices; a voice processing unit 20 which processes the inputted voices; a recording unit 30 which records the voices processed by the voice processing unit 20; and an analysis unit 40 which analyzes the recorded voices and specifies the speaker of each of the voices.

In FIG. 1, the microphones 10 are normal monaural microphones. As described above, the two-channel voices are recorded with the microphones 10. However, in this embodiment, the voices recorded with the monaural microphones are used after being separated into two channels. Note that it is also possible to use stereo microphones as the microphones 10 and to record voices in two channels from the start. However, considering that the voices in the two channels are compared in an analysis by the analysis unit 40 to be described later, it is preferable that the voices recorded with the monaural microphones are separated to be used.

The voice processing unit 20 executes the following processing on the voices inputted with the microphones 10: inversion of voice waveforms; amplification/reduction of voice powers (signal powers); and delaying of voice signals. Accordingly, the voice processing unit 20 gives a unique characteristic to each of the voice signals for each of the microphones 10 (each of the speakers).

The recording unit 30 is a normal two-channel recorder. As the recording unit, a recorder/reproducer using a medium for recording/reproducing such as a MD (Mini Disc), a personal computer including a voice recording function, or the like can be used.

The analysis unit 40 subjects the voices recorded by the recording unit 30 to analyze according to the characteristic of each voice, which is given through the processing by the voice processing unit 20, and specifies the speaker of each voice.

In the above-described configuration, the voice processing unit 20, the recording unit 30, and the analysis unit 40 can be provided as individual units. However, in the case of implementing these units in a computer system such as a personal computer, the units can be also provided as a single unit. Moreover, the voice processing unit 20 and the recording unit 30 may be combined to form a recorder, and voices recorded with this recorder may be analyzed by a computer (analysis device) which is equivalent to the analysis unit 40. According to an environment and conditions in which this embodiment is applied, it is possible to employ a system configuration in which the above-described functions are appropriately combined.

Figure 2:
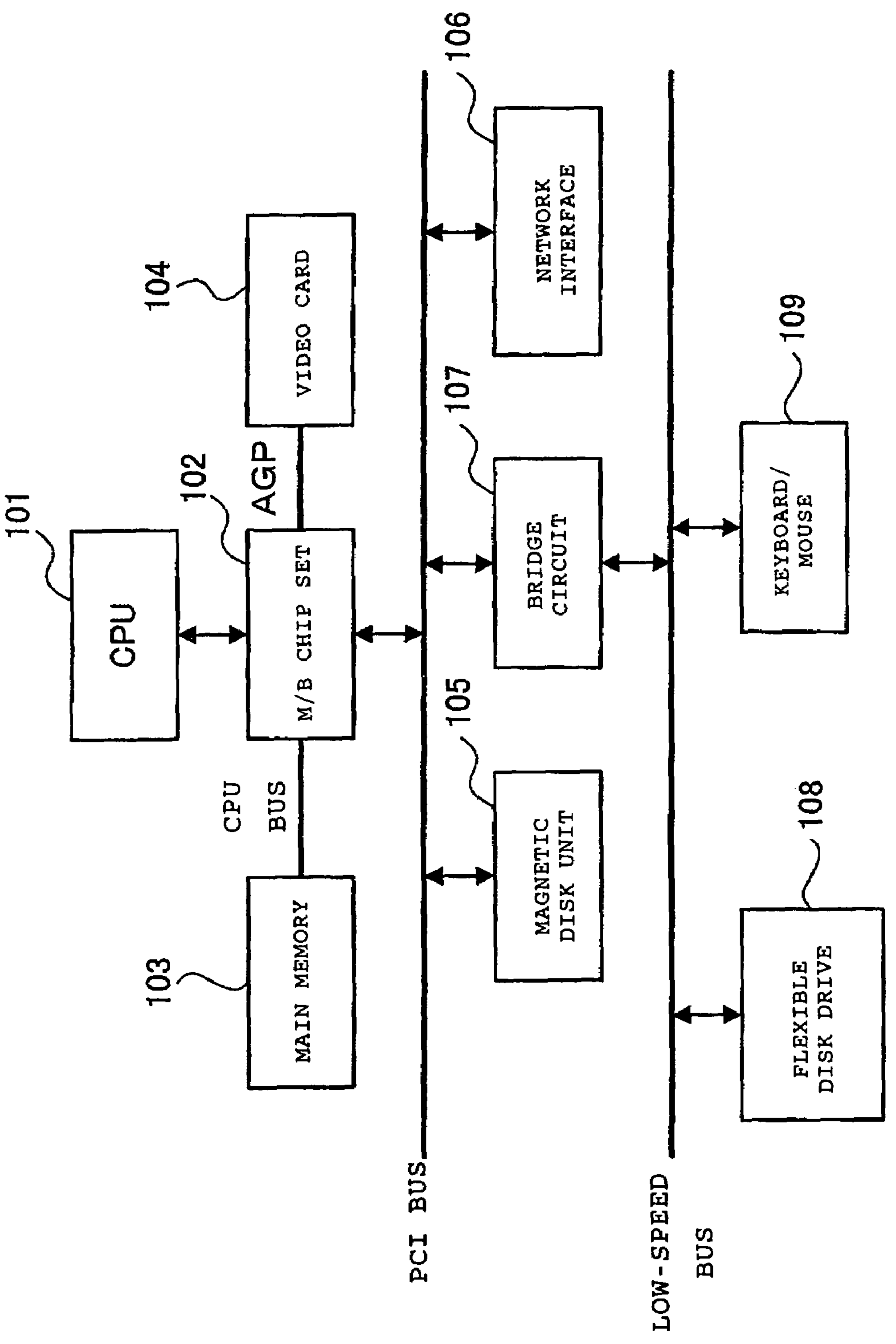
FIG. 2 is a view schematically showing an example of a hardware configuration of a computer device suitable to realize a voice processing unit, a recording unit, and an analysis unit according to this embodiment.

FIG. 2 is a view schematically showing an example of a hardware configuration of a computer device suitable to realize the voice processing unit 20, the recording unit 30, and the analysis unit 40 according to this embodiment.

The computer device shown in FIG. 2 includes: a CPU (Central Processing Unit) 101 that is operation means; a main memory 103 connected to the CPU 101 through a M/B (motherboard) chip set 102 and a CPU bus; a video card 104 similarly connected to the CPU 101 through the M/B chip set 102 and an AGP (Accelerated Graphics Port); a magnetic disk unit (HDD) 105 and a network interface 106 which are connected to the M/B chip set 102 through a PCI (Peripheral Component Interconnect) bus; and a flexible disk drive 108 and a keyboard/mouse 109 which are connected to the M/B chip set 102 through the PCI bus, a bridge circuit 107, and a low-speed bus such as an ISA (Industry Standard Architecture) bus.

Note that FIG. 2 only exemplifies the hardware configuration of the computer device which realizes this embodiment. As long as this embodiment can be applied, various other configurations can be adopted. For example, instead of providing the video card 104, only a video memory may be mounted, and image data may be processed by the CPU 101. Moreover, as an external storage unit, a CD-R (Compact Disc Recordable) or DVD-RAM (Digital Versatile Disc Random Access Memory) drive may be provided through an interface such as an ATA (AT Attachment) or a SCSI (Small Computer System Interface).

In this embodiment, as voice processing for identifying each of the speakers, inversion of voice waveforms, amplification/reduction of voice powers, and delaying of voice signals are employed.

Specifically, a two-channel voice remains unprocessed is set as a reference, and as for a recorded voice of a predetermined speaker, one of two-channel voice waveforms is inverted. Moreover, as for a recorded voice of another predetermined speaker, two-channel voice powers are increased or decreased by different values, respectively. Furthermore, as for a recorded voice of still another predetermined speaker, one of two-channel voice signals is delayed.

Among the voices recorded as described above, as for the voice subjected to unprocessing, the voice power is approximately doubled when voices of two channels are added up, and the voice power becomes approximately 0 when the voice of one of the channels is subtracted from the voice of the other channel. Meanwhile, as for the voice in which the voice waveform of one of the channels is inverted, the voice power becomes approximately 0 when the voices of the two channels are added up, and the voice power is approximately doubled when the voice of one of the channels is subtracted from the voice of the other channel.

As for the recorded voice in which one of the two-channel voice signals is delayed, a difference due to a delay of the two-channel voice signals is corrected. Thereafter, when the voices of the two channels are added up, the voice power is approximately doubled, and when the voice of one of the channels is subtracted from the voice of the other channel, the voice power becomes approximately 0.

Moreover, as for the recorded voice in which the voice powers of the respective channels are increased or decreased, the voices of the two channels are added up or one of the voices is subtracted from the other after the voice powers of the respective channels are more properly increased or decreased according to amplification/reduction in recording. Thus, the voice power can be an integral multiple of the original voice or can be set to 0.

For example, in recording, the voice power of one of the channels (this channel is set to be a first channel) is multiplied by 1, and the voice power of the other channel (this channel is set to be a second channel) is multiplied by 0.5. In this case, when, in reproduction, the voice power of the second channel is doubled and added to the voice of the first channel, the voice power becomes approximately twice as strong as the voice of the first channel. Meanwhile, when the voice of the second channel having the voice power doubled is subtracted from the voice of the first channel, the voice power becomes approximately 0.

In a special case, when, in recording, the voice power of the first channel is multiplied by 1 and the voice power of the second channel is multiplied by 0, even if the voice powers of the two channels are added up in reproduction, the voice power becomes equal to the voice power of the first channel.

In this embodiment, by use of such characteristics given to the recorded voices by the voice processing in recording as described above, the speaker of each of the voices is specified. With an example of concrete processing, operations of this embodiment, particularly operations of the voice processing unit 20 and the analysis unit 40 will be described more in detail below. Note that, in the following operation examples, it is assumed that a plurality of speakers do not make speeches at the same time or that there is no need to accurately identify the speakers in the event that the plurality of speakers make speeches at the same time.

Figure 3:
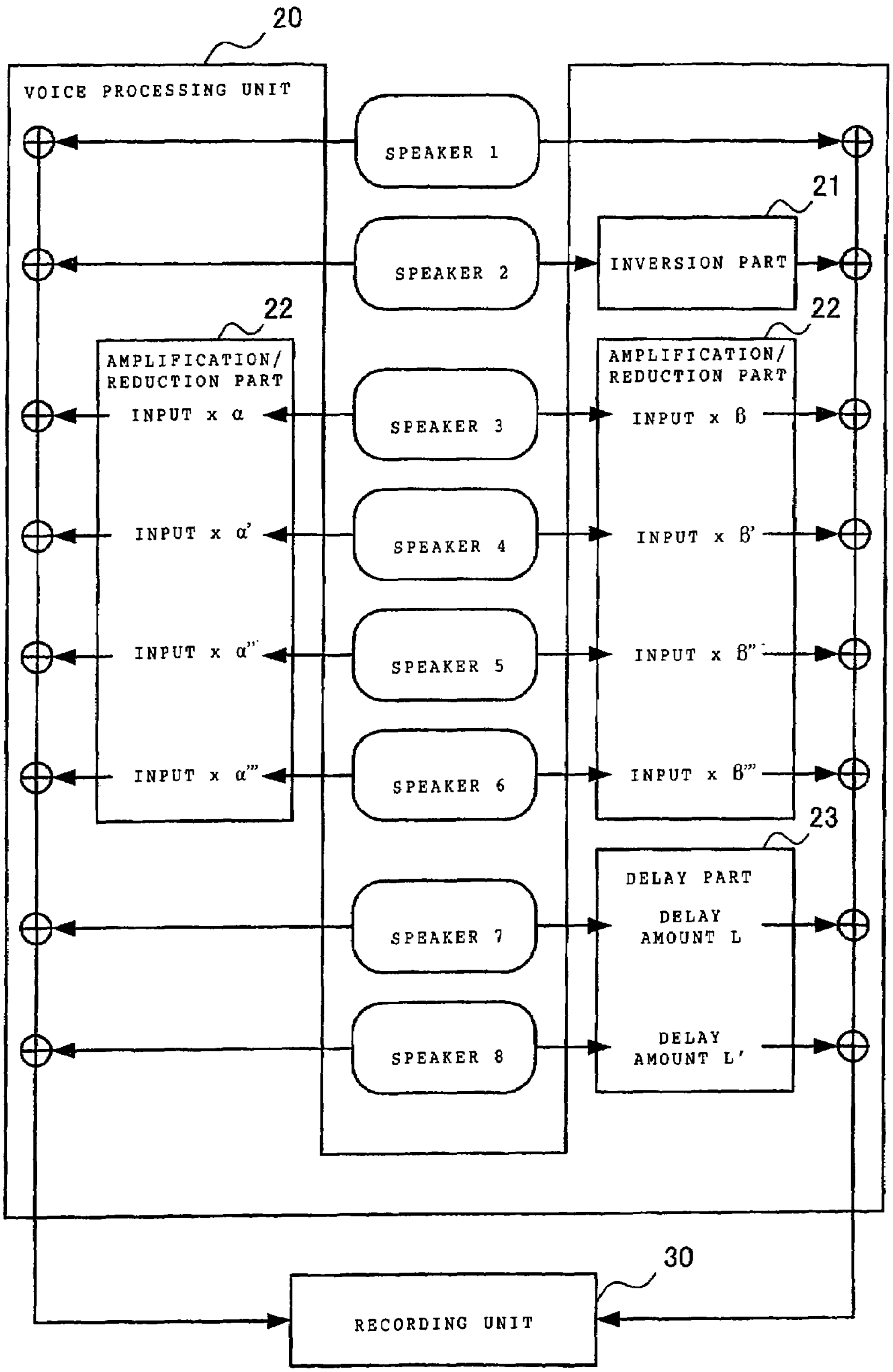
FIG. 3 is a view explaining processing by the voice processing unit of this embodiment.

FIG. 3 is a view explaining processing by the voice processing unit 20.

In the example shown in FIG. 3, it is assumed that there are eight speakers 1 to 8. After the voice processing unit 20 executes different kinds of processing on two-channel voices inputted through the microphones 10 respectively, the voices are synthesized by a mixer for each of the channels and transmitted to the recording unit 30. Moreover, the voice processing unit 20 includes an inversion part 21 which inverts polarities of voice waveforms, an amplification/reduction part 22 which increases or reduces voice powers, and a delay part 23 which delays voice signals for a certain period of time.

With reference to FIG. 3, a voice of speaker 1 is sent to the recording unit 30 after being subjected to unprocessing. A voice of speaker 2 is sent to the recording unit 30 after a voice waveform of a second channel is inverted by the inversion part 21. A voice of speaker 3 is sent to the recording unit 30 after a voice power of a first channel is multiplied by α and a voice power of a second channel is multiplied by β by the amplification/reduction part 22. A voice of speaker 4 is sent to the recording unit 30 after a voice power of a first channel is multiplied by α' and a voice power of a second channel is multiplied by β' by the amplification/reduction part 22. A voice of speaker 5 is sent to the recording unit 30 after a voice power of a first channel is multiplied by α" and a voice power of a second channel is multiplied by β" by the amplification/reduction part 22. A voice of speaker 6 is sent to the recording unit 30 after a voice power of a first channel is multiplied by α''' and a voice power of a second channel is multiplied by β''' by the amplification/reduction part 22. A voice of speaker 7 is sent to the recording unit 30 after a voice signal of a second channel is delayed by a delay amount L by the delay part 23. A voice of speaker 8 is sent to the recording unit 30 after a voice signal of a second channel is delayed by a delay amount L' by the delay part 23.

Here, the respective parameters described above can be arbitrarily set to, for example, α'=β=0, α=β'=α'''=β'''=1, α"=β"'=0.5, L=1 msec (millisecond), and L'=2L=2 msec.

The analysis unit 40 includes reproduction means for reproducing voices recorded on a predetermined medium by the recording unit 30, and analysis means for analyzing reproduced voice signals.

Figure 4:
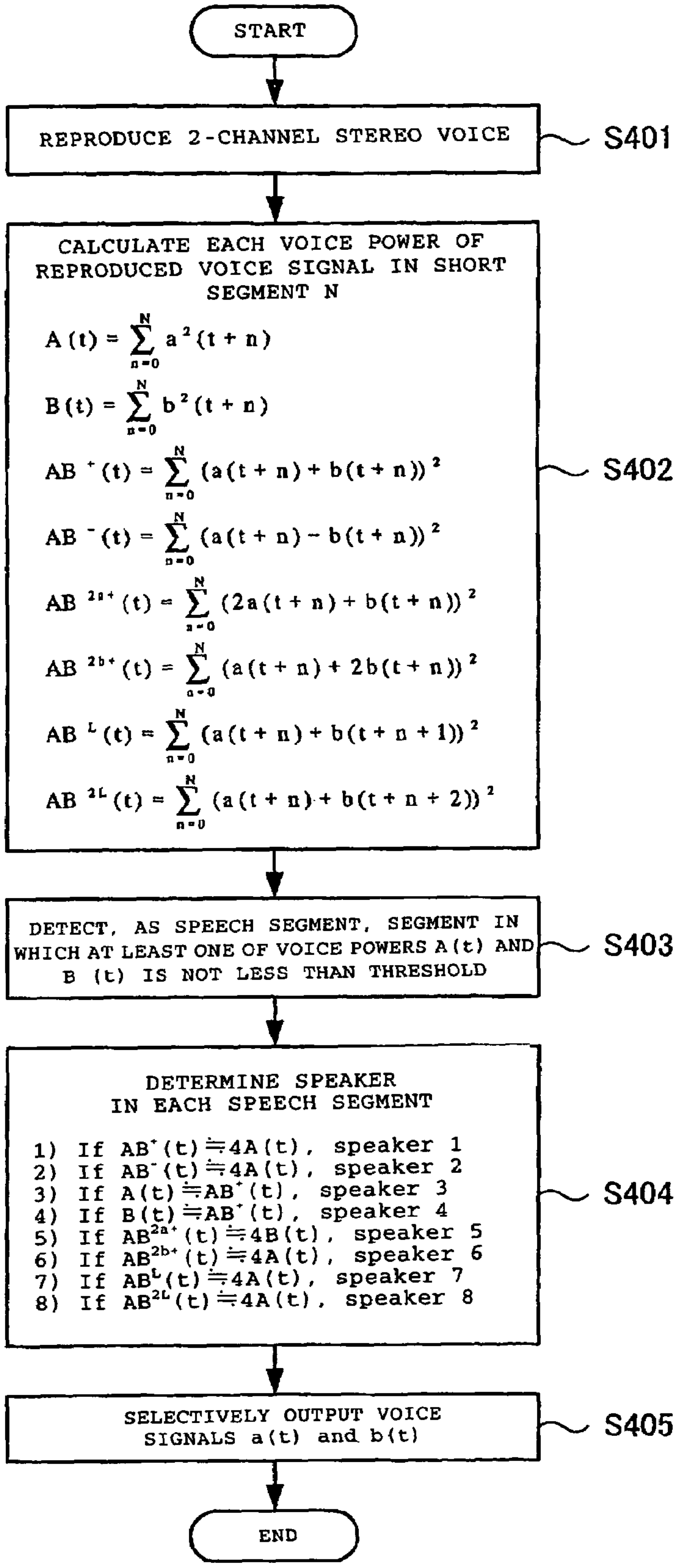
FIG. 4 is a flowchart explaining an operation of the analysis unit of this embodiment.

FIG. 4 is a flowchart explaining operations of the analysis unit 40.

As shown in FIG. 4, the reproduction means of the analysis unit 40 reproduces two-channel voices recorded on the predetermined medium by the recording unit 30 (Step 401). Here, a voice signal of a first channel is set to a(t), and a voice signal of a second channel is set to b(t).

Next, the analysis means of the analysis unit 40 calculates respective voice powers in a short segment N of the reproduced voice signals by the following calculations (Step 402).

[Formula 1]

$$A(t)=\sum_{n=0}^{N} a^2(t+n)$$

$$B(t)=\sum_{n=0}^{N} b^2(t+n)$$

$$AB^{+}(t)=\sum_{n=0}^{N} (a(t+n)+b(t+n))^2$$

$$AB^{-}(t)=\sum_{n=0}^{N} (a(t+n)-b(t+n))^2$$

$$AB^{2a+}(t)=\sum_{n=0}^{N} (2a(t+n)+b(t+n))^2$$

$$AB^{2b+}(t)=\sum_{n=0}^{N} (a(t+n)+2b(t+n))^2$$

$$AB^{L}(t)=\sum_{n=0}^{N} (a(t+n)+b(t+n+1))^2$$

$$AB^{2L}(t)=\sum_{n=0}^{N} (a(t+n)+b(t+n+2))^2$$

Next, the analysis unit 40 sequentially checks the voice powers in the short segment N, which are calculated in Step 402, and detects, as a speech segment, a segment in which at least one of the voice powers A(t) and B(t) is not less than a preset threshold (Step 403). Note that the voices of speakers 7 and 8 are delayed by the delay part 23 of the voice processing unit 20 as described above. However, since the delay amount L is a minute amount, there is no influence on detection of the speech segment.

Next, the analysis unit 40 applies the following determination conditions based on the processing by the voice processing unit 20 and the calculations in Step 402 to each of the speech segments detected in Step 403, and determines the speakers in the respective speech segments (Step 404).

1) If $AB^{+}(t)\approx 4A(t)$, then speaker 1
2) If $AB^{-}(t)\approx 4A(t)$, then speaker 2
3) If $A(t)\approx AB^{+}(t)$, then speaker 3
4) If $B(t)\approx AB^{+}(t)$, then speaker 4
5) If $AB^{2a+}(t)\approx 4B(t)$, then speaker 5
6) If $AB^{2b+}(t)\approx 4A(t)$, then speaker 6
7) If $AB^{L}(t)\approx 4A(t)$, then speaker 7
8) If $AB^{2L}(t)\approx 4A(t)$, then speaker 8

Thereafter, the analysis unit 40 selectively outputs the voice signal a(t) of the first channel or the voice signal b(t) of the second channel to each of the speech segments detected in Step 403, based on determination results of the speakers in Step 404 (Step 405). Specifically, in the speech segments by speakers 1 and 2, any of the voice signals a(t) and b(t) may be outputted. In the speech segments by speakers 3 and 6, since the voice signal a(t) has a stronger voice power than that of the voice signal b(t), the voice signal a(t) is preferably outputted. On the contrary, in the speech segments by speakers 4 and 5, since the voice signal b(t) has a stronger voice power than that of the voice signal a(t), the voice signal b(t) is preferably outputted. In the speech segments by speakers 7 and 8, since the voice signal b(t) is delayed, the voice signal a(t) is preferably outputted.

As described above, according to this embodiment, the two-channel voices are recorded with the microphones 10 corresponding to the plurality of speakers respectively, the voices recorded with the respective microphones 10 are subjected to different kinds of voice processing by the voice processing unit 20 in recording respectively, and the voice signals subjected to the voice processing are mixed for each channel. Thereafter, the mixed voice signals are subjected to an analysis according to the unique characteristic given to each of the microphones 10 (each of the speakers) through the voice processing by the voice processing unit 20. Thus, the speakers of the voices in the individual speech segments can be specified.

In the case of realizing the configurations as described above in the computer shown in FIG. 2, the respective functions of the voice processing unit 20 and the analysis unit 40 are implemented by the program-controlled CPU 101 and storage means such as the main memory 103 and the magnetic disk unit 105. Moreover, the functions of the inversion part 21, the amplification/reduction part 22, and the delay part 23 of the voice processing unit 20 may be implemented in the manner of hardware by circuits having the respective functions.

In the configuration shown in FIG. 1, the voice signals subjected to the voice processing by the voice processing unit 20 are recorded by the recording unit 30, and the analysis unit 40 analyzes the voice signals recorded by the recording unit 30 and specifies each of the speakers. However, this embodiment is intended to give the voice signals such characteristics capable of specifying each of the speakers by processing the voice signals in voice recording as described above. It is needless to say that various system configurations can be employed within this technical idea.

For example, in the case where the functions of the recording unit 30 and the analysis unit 40 are implemented in a single computer system, first, each of the speakers is specified by the analysis unit 40 in advance, as for the voice signals inputted after being subjected to the voice processing by the voice processing unit 20 and mixed. Thereafter, a voice file may be created for each of the speakers and stored in the magnetic disk unit 105 of FIG. 2.

Next, description will be given of an example of applying the embodiment as described above to a system for recording statements in a trial and creating texts (electronic records) from recorded voices.

Figure 5:
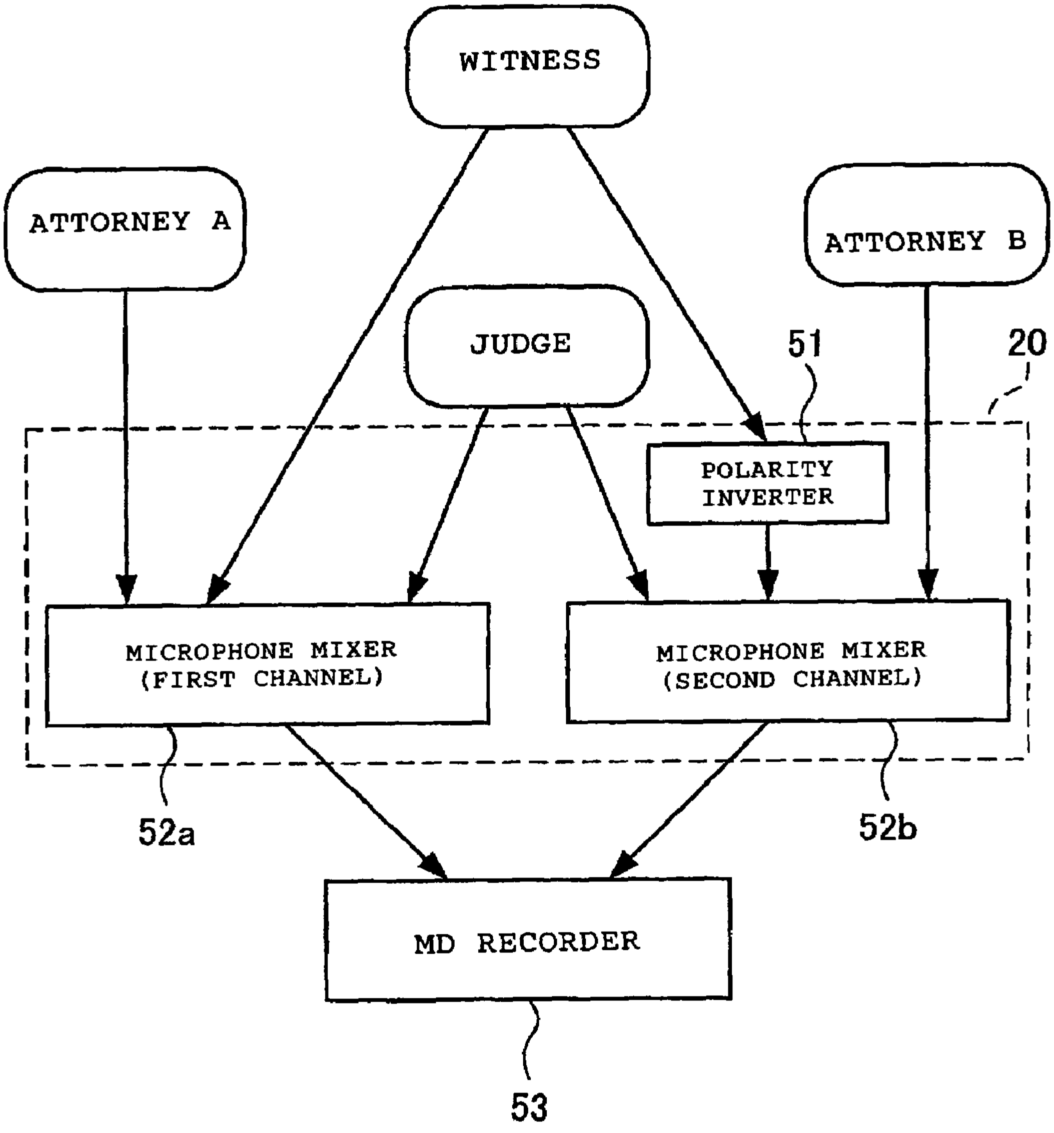
FIG. 5 is a view showing a configuration example in the case where this embodiment is used as voice recording means of an electronic record creation system in a trial.

FIG. 5 is a view showing a configuration example in the case where this embodiment is used as voice recording means of an electronic record creation system in a trial.

In the configuration of FIG. 5, a polarity inverter 51 and microphone mixers 52*a* and 52*b* correspond to the voice processing unit 20 in FIG. 1. Moreover, a MD recorder 53 which records voices on a MD corresponding to the recording unit 30 in FIG. 1.

As the microphones 10, pin microphones are used, which are assumed to be attached to a judge, a witness and attorneys A and B, respectively, and are not shown in FIG. 5. Moreover, in the configuration of FIG. 5, it is assumed that the voices recorded on the MD are separately analyzed by a computer. Thus, the computer corresponding to the analysis unit 40 in FIG. 1 is not shown in FIG. 5, either.

With reference to FIG. 5, in this system, a speech voice of the judge is directly sent to the microphone mixers 52*a* and 52*b*. Moreover, as for a speech voice of the witness, a voice of a first channel is directly sent to the microphone mixer 52*a*, and a voice of a second channel is sent to the microphone mixer 52*b* through the polarity inverter 51. Furthermore, as for a speech voice of the attorney A, only a voice of a first channel is sent to the microphone mixer 52*a*. Meanwhile, as for a speech voice of the attorney B, only a voice of a second channel is sent to the microphone mixer 52*b*.

Therefore, the judge corresponds to speaker 1 in FIG. 3, and the witness corresponds to speaker 2 in FIG. 3. Moreover, given $\alpha'=\beta=0$ and $\alpha=\beta'=1$ in FIG. 3, the attorney A corresponds to speaker 3, and the attorney B corresponds to speaker 4.

Figure 6:
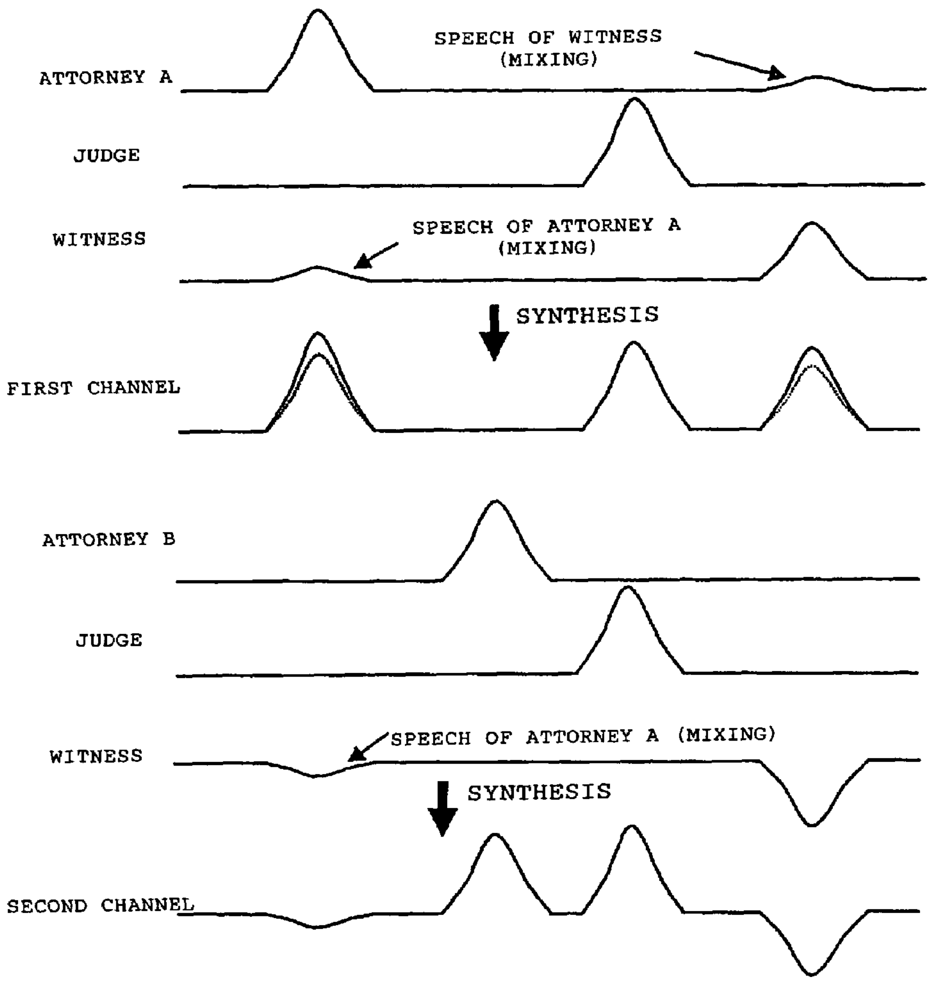
FIG. 6 is a time chart showing waveforms of voices recorded in a predetermined time by the system shown in FIG. 5.

FIG. 6 is a time chart showing waveforms of voices recorded in a predetermined time by the system shown in FIG. 5.

With reference to FIG. 6, the voice of the attorney A and the voices of the first channel in the microphones 10 of the judge and the witness are synthesized by the microphone mixer 52*a*. In addition, the voice of the attorney B and the voices of the second channel in the microphones 10 of the judge and the witness are synthesized by the microphone mixer 52*b*. The voices of the first and second channels shown in FIG. 6 are recorded in first and second channels of the MD respectively, by the MD recorder 53.

Next, the computer (hereinafter referred to as an analysis device), which corresponds to the analysis unit 40 in FIG. 1, reproduces and analyzes the voices recorded on the MD by the system of FIG. 5, and specifies each of speakers (the judge, the witness, the attorney A, and the attorney B) in each of speeches. As to a concrete method, a method of identifying speakers 1 to 4 in the method described above with reference to FIG. 4 may be employed. However, in the case of specifying the speakers from the voices recorded in a special situation such as a trial, the following simplified method can be employed.

Specifically, speeches in a trial have the following characteristics.

Questions and answers make up a large part of dialogues, and a questioner and a respondent do not sequentially switch positions with each other.

Except unexpected remarks such as jeers, only one person makes a speech at one time, and voices rarely overlap.

The order of questioners is decided, and the questioner hardly questions a plurality of respondents at the same time. Thus, answers concerning the same topic tend to be scattered in various portions of voice data.

The speakers of the speech voices recorded by the system of FIG. 5 are limited to four including the judge, the witness, the attorney A, and the attorney B.

Considering the circumstances described above, the speakers of the voices recorded on the MD by the system of FIG. 5 are specified as follows.

1. When a sum of the voice signals of the first and second channels is worked out, a portion in which a voice power is increased is a speech of the judge.

2. When a difference between the voice signals of the first and second channels is worked out, a portion in which a voice power is increased is a speech of the witness.

3. A portion in which the voice power is not significantly changed by the operations of the foregoing cases 1 and 2, and in which a signal exists only in the first channel is a speech of the attorney A.

4. A portion in which the voice power is not significantly changed by the operations of the foregoing cases 1 and 2, and in which a signal exists only in the second channel is a speech of the attorney B.

Therefore, the computer can specify the speakers of the respective speech segments, by determining to which one of the above four cases, each of the speech segments of the voices recorded on the MD corresponds.

Incidentally, in a trial, the attorney may approach the witness to ask a question. In this case, the microphone 10 of the witness picks up a voice of the attorney who approaches the witness and makes a speech. In FIG. 6, the voice waveform of the witness includes a speech voice of the attorney A, and the voice waveform of the attorney A includes a speech voice of the witness. Thus, the voice of the first channel is set in a kind of an echoed state.

However, when the voice signals of the first and second channels in FIG. 6 are compared with each other, a voice component of the attorney A, which is mixed into the voice waveform of the witness, among echo components in the first channel, is not an echo component in the second channel and is recorded as an independent voice. This is because the microphone 10 of the attorney A forms no voice signal of the second channel according to the system configuration of FIG. 5. Therefore, in a spot where the voice component of the attorney A is mixed into the voice waveform of the witness, a clean speech voice of the attorney A can be estimated by subtracting the voice signal of the second channel from the voice signal of the first channel.

Similarly, since the microphone 10 of the attorney A forms no voice signal of the second channel, a voice component of the witness, which is mixed into the voice waveform of the attorney A, is not recorded in the second channel. Therefore, in a spot where the voice component of the witness is mixed into the voice waveform of the attorney A, a clean speech voice of the witness, which is not echoed, can be obtained by selecting the voice signal of the second channel.

The determination of the presence of the echo component as described above can be easily performed by comparing voice powers in a short segment of about several ten milliseconds to several hundred milliseconds with each other. Thus, a clean speech voice of each speaker can be obtained by performing the foregoing operation for the relevant speech segment when the echo component is found.

Figure 7:
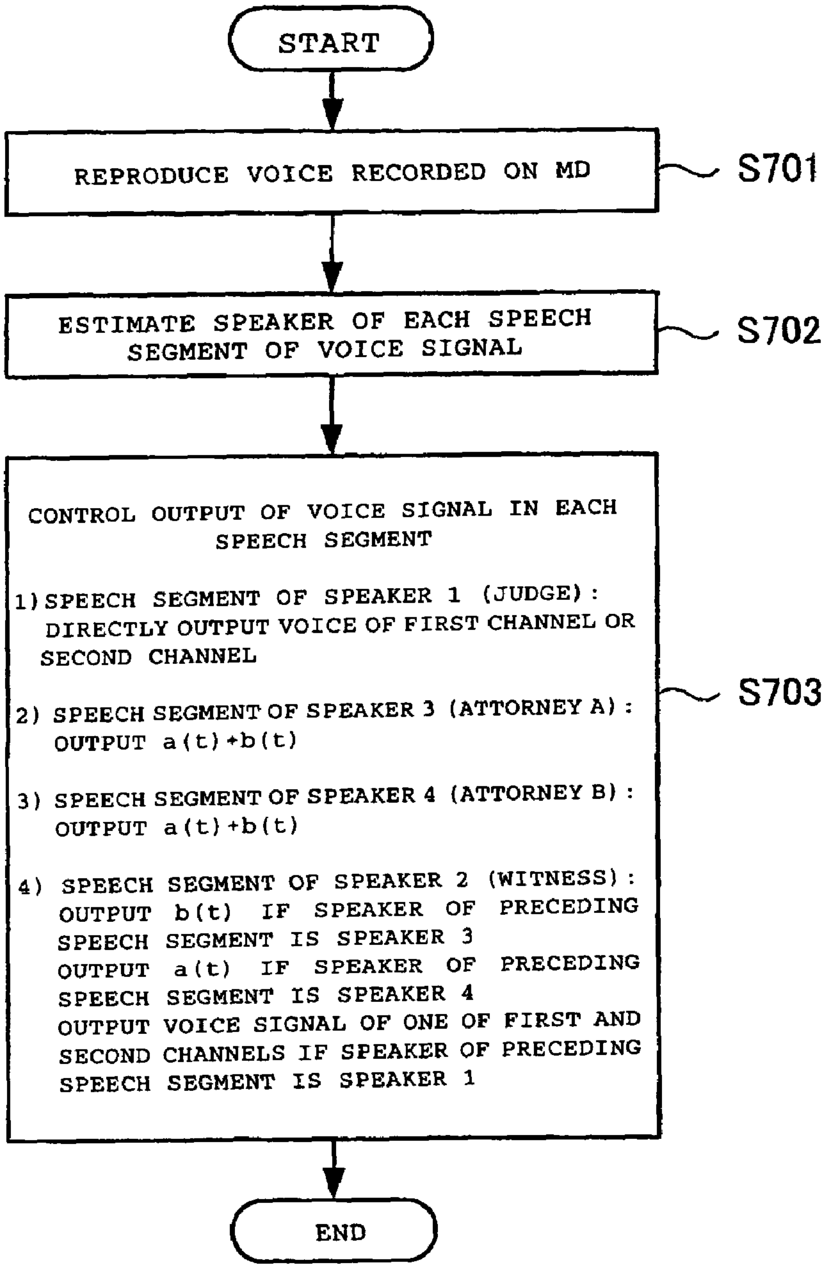
FIG. 7 is a flowchart explaining a method of analyzing voices recorded by the system of FIG. 5.

FIG. 7 is a flowchart explaining a method of analyzing voices recorded by the system of FIG. 5.

As shown in FIG. 7, the analysis device first reproduces the voices recorded on the MD by the MD recorder 53 (Step 701). Next, the analysis device estimates each of the speakers in the respective speech segments of the voice signals through processing similar to Steps 402 to 404 in FIG. 4 or the above-described simplified processing (Step 702). Thereafter, according to the estimated speaker, the voice signals in the respective speech segments are outputted while controlling the voice signals as follows (Step 703).

1) As for the speech segment of speaker 1 (the judge), the voice of the first channel or the second channel is outputted as it is.

2) As for the speech segment of speaker 3 (the attorney A), a(t)+b(t) is outputted (even in the case where the voice of the witness is mixed, since a mixed and superposed voice signal is −b(t), the voice can be cancelled by setting the voice signal to +b(t)).

3) As for the speech segment of speaker 4 (the attorney B), a(t)+b(t) is outputted (even in the case where the voice of the witness is mixed, since a mixed and superposed voice signal is −a(t), the voice can be cancelled by setting the voice signal to +a(t)).

4) As for the speech segment of speaker 2 (the witness), b(t) is outputted if a preceding speech segment of a questioner is speaker 3 (the attorney A), and a(t) is outputted if the preceding speech segment is speaker 4 (the attorney B). Moreover, if the preceding speech segment is speaker 1, any one of the voice signals of the first and second channels may be outputted (although a voice of the attorney who approaches the witness may be mixed in through the microphone on the witness, a voice signal without any voice mixed therein can be outputted by using a voice signal on the side including the attorney who is not the questioner).

As described above, according to this embodiment, different kinds of voice processing are executed on the voices recorded with the microphones 10 of the respective speakers in recording respectively, and an analysis according to the executed voice processing is performed. Thus, the speakers of the individual voices are specified. As the contents of the voice processing, the processing of manipulating the voice signals (waveforms) themselves is performed, such as inversion of voice waveforms, amplification/reduction of voice powers, and delaying of voice signals.

As expansion of this embodiment, there is considered a technique of padding, by use of a data hiding method, identification information from voice signals outside an audible range, in the voices recorded with the respective microphones 10. In this case, each of the speakers can be easily specified by detecting the identification information buried in the voice signals.

Although the preferred embodiment of the present invention has been described in detail, it should be understood that various changes, substitutions and alternations can be made therein without departing from spirit and scope of the inventions as defined by the appended claims.

What is claimed is:

1. A voice processing method, comprising:

performing a first voice process, a second voice process, and a third voice process by a voice processor realized by a computer on voice signals recorded on a microphone, wherein the first voice process to inverses one of a plurality of polarities of two-channel voice signals for voice signals obtained through the microphone, and wherein the second voice process changes one of a plurality of signal powers of the two-channel voice signals for voice signals obtained through the microphone, and wherein the third voice process delays one of the two-channel voice signals for voice signals obtained through the microphone, and mixes the voice signals per channel;

analyzing mixed two-channel voice signals according to characteristics of the mixed two-channel voice signals;

analyzing a difference of the mixed two-channel voice signals to determine a speaker of the mixed two-channel voice signals;

determining a voice signal in which the first voice process has been applied, and the signal power of the voice signal in a predetermined segment has been increased, and specifying the microphone that recorded said voice signal;

changing one of the signal powers of the mixed two-channel voice signals;

summing the two-channel voice signals to determine the voice signal in the segment as the voice signal in which the second voice process was applied to the integral multiple of the original signal power, for an increase in the signal power of the voice signal in the predetermined segment;

summing the two channel voice signals after correcting a delay by the voice processing unit on one of the mixed two channel voice signals;

determining that the second voice process was applied to the voice signal in the segment after the signal power of the voice signal in the predetermined segment is increased to the integral multiple of the original signal power; and determining that at least one of a plurality of microphones have recorded the voice signal.

2. The voice processing method according claim 1, wherein the voice processor further records the voice signals subjected to the voice processing on a predetermined recording medium; and the voice recorded on the predetermined recording medium is reproduced and analyzed, and a speaker is specified.

* * * * *

UNITED STATES PATENT AND TRADEMARK OFFICE

CERTIFICATE OF CORRECTION

PATENT NO. : 7,599,836 B2
APPLICATION NO. : 11/136831
DATED : October 6, 2009
INVENTOR(S) : Ichikawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Twenty-eighth Day of September, 2010

David J. Kappos
*Director of the United States Patent and Trademark Office*